United States Patent [19]

Sunagawa et al.

[11] Patent Number: 4,885,732
[45] Date of Patent: Dec. 5, 1989

[54] OPTICAL PICKUP APPARATUS FOR DETECTING AND CORRECTING FOCUSING AND TRACKING ERRORS IN DETECTED RECORDED SIGNALS

[75] Inventors: Hiroshi Sunagawa, Kanagawa; Hiroshi Nishihara, Ohsaka, both of Japan; Toshiaki Suhara, Glasgow, Scotland

[73] Assignee: Fuji Photo Film Co., Ltd., Kanagawa, Japan

[21] Appl. No.: 92,256

[22] Filed: Sep. 2, 1987

[30] Foreign Application Priority Data

Sep. 2, 1986 [JP] Japan .................................. 61-206257
Sep. 2, 1986 [JP] Japan .................................. 61-206258

[51] Int. Cl.$^4$ .............................................. G11B 7/00
[52] U.S. Cl. .......................................... 369/44; 369/45; 350/96.12; 350/96.14; 350/96.15
[58] Field of Search ............... 350/96.13, 96.14, 96.15, 350/96.16, 96.18; 369/43–47, 112; 358/342; 250/201 DF

[56] References Cited

U.S. PATENT DOCUMENTS

| | | | |
|---|---|---|---|
| 4,672,187 | 6/1987 | Fujita et al. | 369/112 X |
| 4,718,052 | 1/1988 | Kondo et al. | 369/46 |
| 4,737,946 | 4/1988 | Yamashita et al. | 369/45 |
| 4,797,867 | 1/1989 | Sunagawa et al. | 369/45 |

FOREIGN PATENT DOCUMENTS 3522849  1/1986  Fed. Rep. of Germany .
3534776  4/1986  Fed. Rep. of Germany .
2059057  4/1981  United Kingdom .

OTHER PUBLICATIONS

Patents Abstracts of Japan, vol. 10, No. 229, (P-485)(2285), 8-8-86.

Primary Examiner—Robert L. Richardson
Attorney, Agent, or Firm—Sughrue, Mion, Zinn, Macpeak & Seas

[57] ABSTRACT

An optical pickup apparatus comprises an optical waveguide disposed to receive a light beam reflected by an optical recording medium, first and second focusing grating couplers disposed side by side on the optical waveguide for coupling the reflected light beam into the optical waveguide and converging the optical wave guided through the optical waveguide to positions spaced from each other, and first and second photodetectors secured to the optical waveguide for respectively detecting the optical waves converged by the first and second focusing grating couplers so that reading out of recorded information, detection of tracking error and detection of focusing error can be effected. Or, the optical pickup apparatus comprises a grating lens disposed to receive and split the reflected light beam from an optical path of the light beam advancing toward the optical recording medium and to converge the reflected light beam, and a photodetector for detecting the reflected light beam passing through the grating lens so that reading out of recorded information, detection of a tracking error and detection of a focusing error can be effected.

33 Claims, 12 Drawing Sheets

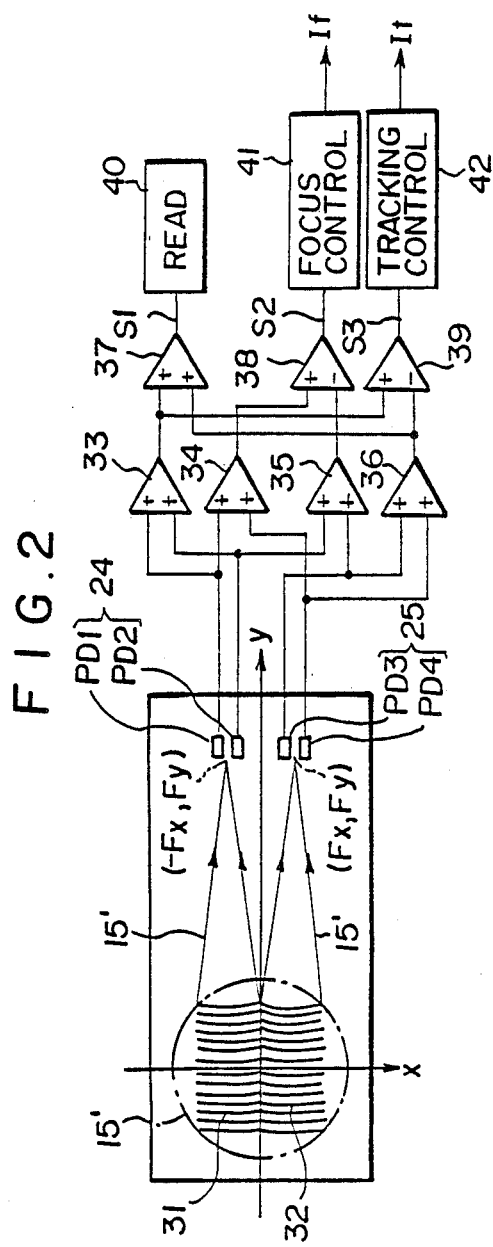
F I G. 2
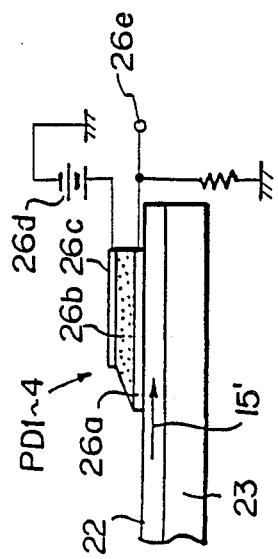
F I G. 3

OPTICAL PICKUP APPARATUS FOR DETECTING AND CORRECTING FOCUSING AND TRACKING ERRORS IN DETECTED RECORDED SIGNALS

BACKGROUND OF THE INVENTION

1. Field of the Invention

This invention relates to an optical pickup apparatus for detecting (reading out) signals recorded on an optical recording medium such as an optical disk. This invention particularly relates to an optical pickup apparatus using an optical waveguide or a grating lens.

2. Description of the Prior Art

In recent years, optical recording media such as optical disks are widely used as recording media for image signals, audio signals or the like. Signals recorded on the optical recording medium in the form of pits, differences in reflectivity, or the like are detected by use of an optical pickup apparatus. (The case where signals are recorded using pits is hereinafter taken as an example.) The optical pickup apparatus is constituted to expose the surface of the optical recording medium to light such as a laser beam, and to detect the level of the light reflected by the optical recording medium, thereby to detect the presence or absence of a pit on the surface of the optical recording medium.

Besides the function of carrying out detection of the recorded signals as mentioned above, the optical pickup apparatus is required to have the function of detecting a tracking error, i.e. the function of detecting whether the light beam for pit detection is deviated rightward or leftward from the center of a predetermined pit string (track), and the function of detecting a focusing error, i.e. the function of detecting whether the focusing point of the light beam is deviated forward or backward from the reflection surface of the optical recording medium. A signal representing the tracking error or the focusing error is utilized to control tracking or focusing so that the signal is canceled, thereby to irradiate the light beam accurately to the predetermined track or to focus the light beam accurately onto the reflection surface of the optical recording medium. As the method of detecting a tracking error, there have heretofore been known the push-pull technique, the heterodyning technique, temporal (time difference) detection technique and other such techniques. On the other hand, as the method of detecting a focusing error, there have heretofore been known the astigmatism technique, the critical angle detection technique, the Foucault technique and other such techniques.

In order to provide the aforesaid functions, the conventional optical pickup apparatus is composed of small optical elements such as a beam splitter for splitting a light beam reflected by an optical recording medium from the light beam irradiated onto the optical recording medium, a lens for converging the reflected light beam in the vicinity of a photodetector such as a photodiode, and a prism for carrying out the tracking error detecting method and the focusing error detecting method.

However, the aforesaid small optical elements require accurate machining or processing, and troublesome adjustment of positions of the small optical elements with respect to each another must be carried out at the time of assembling the optical pickup apparatus. Therefore, the optical pickup apparatus using such optical elements naturally becomes expensive. Also, the optical pickup apparatus having the configuration as mentioned above is large and heavy, and therefore is disadvantageous from the viewpoint of making the read-out apparatus small and light and shortening the access time.

Accordingly, various attempts have heretofore been made to eliminate the aforesaid drawbacks of the conventional optical pickup apparatus by simplifying the configuration of the optical pickup apparatus by use of, for example, a special optical element such as an aspherical lens. However, the optical element of this type is very expensive, and therefore the cost of the optical pickup apparatus using such an optical element does not become much lower than the cost of the aforesaid optical pickup apparatus even though the configuration is simplified.

SUMMARY OF THE INVENTION

The primary object of the present invention is to provide an optical pickup apparatus which is small and light.

Another object of the present invention is to provide an optical pickup apparatus which is fabricated with a very low cost.

The present invention provides an optical pickup apparatus comprising:

(i) a light source for emitting a light beam onto a surface of an optical recording medium, (ii) an objective lens for converging said light beam onto the reflection surface of said optical recording medium, (iii) an optical waveguide disposed in such a direction that one surface thereof receives the light beam reflected by said optical recording medium, (iv) a first focusing grating coupler and a second focusing grating coupler disposed side by side at an incidence position of said reflected light beam adjacent the surface of said optical waveguide so that an axis passing through approximately the center of said reflected light beam and extending on said surface of said optical waveguide approximately normal to a tracking direction intervenes between said first focusing grating coupler and said second focusing grating coupler, said first focusing grating coupler and said second focusing grating coupler respectively making said reflected light beam enter said optical waveguide and respectively converging the optical wave, which is thus guided through said optical waveguide, to positions spaced from each other with said axis intervening therebetween, and (v) a first-set photodetector and a second-set photodetector secured to the surface or an edge face of said optical waveguide for respectively detecting the optical wave converged by said first focusing grating coupler and the optical wave converged by said second focusing grating coupler so that reading out of recorded information, detection of a tracking error and detection of a focusing error can be effected.

The present invention also provides an optical pickup apparatus comprising:

(i) a light source for emitting a light beam onto a surface of an optical recording medium, (ii) an objective lens for converging said light beam onto the reflection surface of said optical recording medium, (iii) a grating lens disposed in such a direction that one surface thereof receives the light beam reflected by said optical recording medium, thereby to split said reflected light beam from an optical path of said light beam advancing toward said optical recording medium and to converge said reflected light beam, and (iv) a photodetector for detecting said reflected light beam passing through said grating lens so that reading out of recorded information, detection of a tracking error and detection of a focusing error can be effected.

With the first mentioned optical pickup apparatus and the second mentioned optical pickup apparatus in accordance with the present invention, the effects of the optical elements such as a beam splitter, a lens, a prism and the like in the conventional optical pickup apparatus are achieved by the focusing grating couplers formed on the optical waveguide or by the grating lens. Therefore, the optical pickup apparatus in accordance with the present invention can be fabricated small and light with a very small number of parts. Accordingly, the cost of the apparatus becomes markedly lower and the access time can be shortened as compared with the conventional optical pickup apparatus.

Also, the major part of the optical pickup apparatus in accordance with the present invention can be readily mass-produced by a planar technique. This feature also contributes to reduction in the cost of the apparatus.

The optical pickup apparatus in accordance with the present invention is free from adjustment of positions of the optical elements as in the conventional optical pickup apparatus. Further, with the first mentioned optical pickup apparatus in accordance with the present invention wherein the photodetectors are coupled with the optical waveguide, it is not necessary to carry out adjustment of the position of the photodetectors with respect to the optical elements. These features also contribute to reduction in the cost of the apparatus.

In the first mentioned optical pickup apparatus in accordance with the present invention, each of the first focusing grating coupler and the second focusing grating coupler is a diffraction grating having a curvature or a curvature and "chirp". The focusing grating coupler directly couples the wave surface outside of the optical waveguide with the wave surface of the optical wave guided inside of the optical waveguide, and converges the guided optical wave in the optical waveguide.

In the first mentioned optical pickup apparatus in accordance with the present invention, the light beam reflected by the optical recording medium is coupled by the first focusing grating coupler and the second focusing grating coupler into the optical waveguide, and is thus separated from the optical path of the light beam advancing from the light source toward the optical recording medium. This effect is the same as the effect of the beam splitter in the conventional optical pickup apparatus. Also, the first focusing grating coupler and the second focusing grating coupler converge the guided optical wave (reflected light beam) in the optical waveguide. The converging effect of the first focusing grating coupler and the second focusing grating coupler is the same as the effect of the lens in the conventional optical pickup apparatus. Further, since the two focusing grating couplers are disposed at the positions as mentioned above, the light beam reflected by the optical recording medium and incident upon the focusing grating couplers is separated into two guided optical waves in the tracking direction and converged onto two spots. This effect is the same as the effect of the prism in the conventional optical pickup apparatus.

In the second mentioned optical pickup apparatus in accordance with the present invention, the grating lens comprises a transparent member, and a diffraction grating having a curvature or a curvature and "chirp" and formed on the surface of the transparent member. The grating lens diffracts the light impinging thereupon and converges the diffracted light.

In the second mentioned optical pickup apparatus in accordance with the present invention, the light beam reflected by the optical recording medium is separated by the diffracting action of the grating lens from the optical path of the light beam advancing from the light source toward the optical recording medium. This effect is the same as the effect of the beam splitter in the conventional optical pickup apparatus. Also, the grating lens converges the reflected light beam, and thus achieves the same effect as the lens in the conventional optical pickup apparatus.

Also, two grating lenses may be disposed to split the light beam reflected by the optical recording medium into two beams in the tracking direction for the purposes of detection of a tracking error and detection of a focusing error. Or, an astigmatism lens may be utilized as the grating lens, thereby to give rise to astigmatism in the reflected light beam for the purposes of detection of a tracking error and detection of a focusing error. This effect is the same as the effect of the prism or a cylindrical lens in the conventional optical pickup apparatus.

BRIEF DESCRIPTION OF THE DRAWINGS

FIG. 2 is a schematic view showing the top plan shape of the optical waveguide in the embodiment shown in FIG. 1 and the electric circuit used for the embodiment, FIG. 3 is a side view showing the photodetector in the embodiment shown in FIG. 1, FIGS. 4 and 5 are side views showing further embodiments of the optical pickup apparatus in accordance with the present invention.

DESCRIPTION OF THE PREFERRED EMBODIMENTS

The present invention will hereinbelow be described in further detail with reference to the accompanying drawings.

Figure 1:
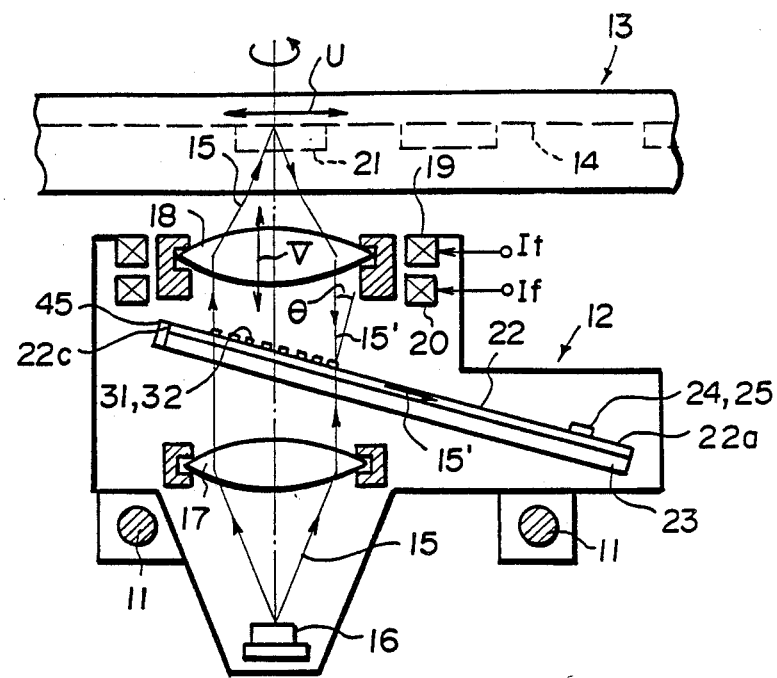
FIG. 1 is a side view showing an embodiment of the optical pickup apparatus in accordance with the present invention.

FIG. 1 shows an embodiment of the optical pickup apparatus in accordance with the present invention, and FIG. 2 shows the top plan view of an optical waveguide in the embodiment shown in FIG. 1 and an electric circuit used for the embodiment shown in FIG. 1. As shown in FIG. 1, the optical pickup apparatus is provided with rods 11, 11 extending at an angle approximately normal to the drawing sheet in FIG. 1, and a block 12 moveable along the rods 11, 11. In order to follow along a pit string (track), the block 12 is moved normal to or approximately normal to the array direction of pits 21 on an optical disk 13 (i.e. the direction as indicated by the arrow U at the light beam incidence position) by, for example, a precision feed screw and an optical system feed motor.

The block 12 is provided with a semiconductor laser 16 for emitting a light beam (a laser beam) 15 to a reflection surface 14 of the optical disk 13, a collimator lens 17 for collimating the divergent light beam 15 emitted by the semiconductor laser 16, and an objective lens 18 for converging the collimated light beam 15 onto the reflection surface 14 of the optical disk 13. For the purposes of tracking control and focusing control as will be described later, the objective lens 18 is moveably supported in a tracking direction normal to the direction as indicated by the arrow U and in a focusing direction as indicated by the arrow V, and is moved in these directions by a tracking coil 19 and a focusing coil 20.

An optical waveguide 22 is disposed between the collimator lens 17 and the objective lens 18 in such a direction that a surface 22a of the optical waveguide 22 receives a light beam 15' reflected by the optical disk 13. The optical waveguide 22 is formed on a transparent support 23. Also, a first focusing grating coupler 31 and a second focusing grating coupler 32 are disposed adjacent to each other on the surface 22a of the optical waveguide 22 at the position upon which the reflected light beam 15' impinges. (The focusing grating coupler will hereinafter be abbreviated as FGC.) Each of the FGC 31 and the FGC 32 is a diffraction grating having a curvature or a curvature and "chirp". The FGC 31 and the FGC 32 respectively couple the reflected light beam 15' into the optical waveguide 22 and converge the reflected light beam 15' (optical waves 15', 15' thus guided through the optical waveguide 22 into a single spot in the optical waveguide 22. As shown in FIG. 2, the FGC 31 and the FGC 32 are disposed side by side so that a y axis on the optical waveguide 22 normal to the aforesaid tracking direction and passing through nearly the center of the reflected light beam 15' intervenes between the FGC 31 and the FGC 32. Also, the FGC 31 and the FGC 32 are formed to converge the optical waves 15', 15' to positions spaced from each other with the y axis intervening therebetween. When positions on the optical waveguide 22 are defined by the y axis and an x axis, i.e. the axis in the tracking direction, in FIG. 2 and coordinates of the optical wave converging positions by the FGC 31 and the FGC 32 are respectively expressed as (−Fx, Fy) and (Fx, Fy), an m'th grating pattern of each of the FGC 31 and the FGC 32 having the aforesaid effects is expressed as $$y\sin\theta + N\sqrt{(x \mp Fx)^2 + (y - Fy)^2} = m\lambda + \text{const.}$$

$$\left( x \gtreqless 0, \text{ double signs in same order} \right)$$

where λ denotes the optical wavelength of the reflected light beam 15', θ denotes the angle of incidence of the reflected light beam 15' upon the FGC 31 and the FGC 32, and N denotes the effective refractive index of the optical waveguide 22.

The optical waveguide 22 may be formed by, for example, sputtering #7059 glass onto the support 23 made of pyrex glass. On the other hand, the FGC 31 and the FGC 32 may be formed by, for example, forming a Si-N film on the optical waveguide 22 by PCVD (plasma-enhanced chemical vapor deposition), forming a resist pattern by the electron beam direct drawing method, and then transferring the pattern to the Si-N film by RIE.

On the other hand, a first-set of photodetectors 24 and a second-set of photodetector 25 are disposed on the surface 22a of the optical waveguide 22 for respectively detecting the optical waves 15', 15' converged in the manner as mentioned above. By way of example, the first-set of photodetector 24 is composed of photodiodes PD1 and PD2 divided from each other by a gap extending in parallel with the y axis, and the second-set of photodetector 25 is composed of photodiodes PD3 and PD4 divided from each other by a gap extending in parallel with the y axis. As shown in detail in FIG. 3, each of the photodiodes PD1 to PD4 is formed by, for example, stacking a lower transparent electrode 26a, a thin film-like photoconductive material 26b, and an upper electrode 26c in this order on the optical waveguide 22. Also, an electric power source 26d is connected to apply a predetermined electric field between the lower transparent electrode 26a and the upper electrode 26c. With the photodiodes PD1 to PD4 having the configuration as mentioned above, when the photoconductive material 26b is exposed to light, a photocurrent of a level proportional to the amount of light flows through the photoconductive material 26b. Therefore, the amount of light which the photoconductive material 26b receives can be detected by detecting the level of the electric current flowing through an external circuit via a terminal 26e. The thin film-like photoconductive material 26b may be constituted by, for example, an epitaxial film, a polycrystalline film or an amorphous film formed of Si or Ge as an element of Group IV of the periodic table, Se as an element of Group VI, GaAs of Groups III and V, ZnO or CdS of Groups II and VI, or PbS of Groups IV and VI. The thin film-like photoconductive material 26b may also be constituted by a film forming a photodiode by generating the p-n junction or the p-i-n junction by the addition of atoms (B, P or the like) of the Group III or Group V to an amorphous calcogen film (a-Se, a-Se-As-Te or the like) or a film containing amorphous Si as the main constituent and also containing hydrogen and/or fluorine (a-Si:H, a-SiGe:H, a-SiC:H or the like), or by a film forming a photodiode by use of the film containing amorphous Si as the main constituent and also containing hydrogen and/or fluorine and an electrode constituting the Schottky junction.

As shown in FIG. 2, the outputs of the photodiodes PD1 and PD2 are added together by an addition amplifier 33, and the outputs of the photodiodes PD3 and PD4 are added together by an addition amplifier 36. Also, the output of the outer photodiode PD1 of the first-set photodetector 24 and the output of the outer photodiode PD4 of the second-set photodetector 25 are added together by an addition amplifier 34, and the outputs of the inner photodiodes PD2 and PD3 are added together by an addition amplifier 35. The outputs of the addition amplifiers 33 and 36 are fed to an addition amplifier 37 and a differential amplifier 39, and the outputs of the addition amplifiers 34 and 35 are fed to a differential amplifier 38. An output S1 of the addition amplifier 37, an output S2 of the differential amplifier 38, and an output S3 of the differential amplifier 39 are respectively fed to a read-out circuit 40, a focusing coil drive control circuit 41 and a tracking coil drive control circuit 42.

Operations of the optical pickup apparatus having the configuration as mentioned above will be described hereinbelow. The light beam (laser beam) 15 emitted by the semiconductor laser 16 and collimated by the collimator lens 17 passes through the support 23 and is converged by the objective lens 18 so that the light beam 15 is focused on the reflection surface 14 of the optical disk 13. The optical disk 13 is rotated by a rotation drive means (not shown) so that the string (track) of pits 21 is moved in the direction as indicated by the arrow U at the incidence position of the light beam 15. As is well known, the pits 21 carry image signals, audio signals or the like. The level of the light beam 15' reflected by the optical disk 13 becomes high at a portion free of the pits 21, and becomes low at a portion where the pits 21 are present. The reflected light beam 15' passes through the objective lens 18, and is coupled into the optical waveguide 22 by the FGC 31 and the FGC 32. The optical waves 15', 15' (reflected light beam 15') guided through the optical waveguide 22 are converged into two spots with the y axis intervening therebetween by the beam converging effects of the FGC 31 and the FGC 32. The light amount of the optical wave 15' converged by the FGC 31 is detected by the photodiodes PD1 and PD2, and the light amount of the optical wave 15' converged by the FGC 32 is detected by the photodiodes PD3 and PD4. Therefore, the output S1 of the addition amplifier 37 which adds the outputs of the addition amplifiers 33 and 36 together represents the overall light amount of the light beam 15' reflected by the optical disk 13, i.e. irrespective of presence or absence of the pits 21 on the optical disk 13. The output S1 is subjected to read-out processing in the read-out circuit 40, and the information recorded on the optical disk 13 is read out in this manner.

The block 12 is moved normal to or approximately normal to the direction as indicated by the arrow U by the optical system feed motor as mentioned above, whereby the incidence position (the position in the radial direction of the optical disk 13) of the light beam 15 upon the optical disk 13 is changed and the pits 21 are read out sequentially. The light beam 15 must be made to impinge accurately upon the center of the predetermined pit string (track). The tracking control for accurately maintaining the incidence position of the light beam 15 upon the optical disk 13 will be described below. When the center of the reflected light beam 15' is positioned exactly between the FGC 31 and the FGC 32, the light amount detected by the first-set photodetector 24 (i.e. the photodiodes PD1 and PD2) and the light amount detected by the second-set photodetector 25 (i.e. the photodiodes PD3 and PD4) coincide with each other. Therefore, in this case, the output S3 of the differential amplifier 39 becomes 0 (zero). On the other hand, when the incidence position of the light beam 15 upon the optical disk 13 becomes incorrect and the optical intensity distribution of the reflected light beam 15' is deviated upwardly in FIG. 2, the light amount detected by the first-set of photodetectors 24 becomes larger than the light amount detected by the second-set of photodetectors 25. Therefore, in this case, the output S3 of the differential amplifier 39 becomes "+" (plus). Conversely, when the optical intensity distribution of the reflected light beam 15' is deviated downwardly in FIG. 2, the output S3 of the differential amplifier 39 becomes "−" (minus). That is, the output S3 of the differential amplifier 39 represents the direction of the tracking error (the direction as indicated by the arrow x in FIG. 2). The output S3 is fed as a tracking error signal to the tracking coil drive control circuit 42. The technique of detecting the tracking error by processing the outputs of the photodiodes PD1 to PD4 in the manner as mentioned above has heretofore been established as the push-pull technique. Upon receiving the tracking error signal S3, the tracking coil drive control circuit 42 feeds an electric current. It in accordance with the direction of the tracking error represented by the signal S3 to the tracking coil 19 for moving the objective lens 18 in a direction that cancels the tracking error. In this manner, the light beam 15 is made to impinge accurately upon the center of the pit string.

The focusing control for converging the light beam 15 accurately onto the reflection surface 14 of the optical disk 13 will be described hereinbelow. When the light beam 15 is focused accurately on the reflection surface 14 of the optical disk 13, the optical wave 15' converged by the FGC 31 is converged at the middle position between the photodiodes PD1 and PD2. At this time, the optical wave 15' converged by the FGC 32 is converged at the middle position between the photodiodes PD3 and PD4. Therefore, the output of the addition amplifier 34 and the output of the addition amplifier 35 become equal to each other, and the output S2 of the differential amplifier 38 becomes 0 (zero). On the other hand, in the case where the light beam 15 is converged at a position forward from the reflection surface 14, the reflected light beam 15' impinges in the converged form upon the FGC 31 and FGC 32, and the incidence positions of the optical waves 15', 15' upon the first-set of photodetectors 24 and the second-set of photodetector 25 are deviated inwardly, i.e. toward the photodiode PD2 and toward the photodiode PD3. Therefore, in this case, the output of the addition amplifier 34 becomes lower than the output of the addition amplifier 35, and the output S2 of the differential amplifier 38 becomes "−" (minus). Conversely, in the case where the light beam 15 is converged at a position backward from the reflection surface 14, the reflected light beam 15' impinges in the divergent form upon the FGC 31 and the FGC 32, and the incidence positions of the optical waves 15', 15' upon the first-set of photodetectors 24 and the second-set of photodetectors 25 are deviated outwardly, i.e. toward the photodiode PD1 and toward the photodiode PD4. Therefore, in this case, the output of the addition amplifier 34 becomes higher than the output of the addition amplifier 35, and the output S2 of the differential amplifier 38 becomes "+" (plus). Thus the output S2 of the differential amplifier 38 represents the direction of the focusing error. The output S2 is fed as a focusing error signal to the focusing coil drive control circuit 41. The technique of detecting the focusing error by processing the outputs of the photodiodes PD1 to PD4 in the manner as mentioned above has heretofore been carried out in the Foucault technique using a Foucault prism. Upon receiving the focusing error signal S2, the focusing coil drive control circuit 41 feeds an electric current. If in accordance with the direction of the focusing error represented by the signal S2 to the focusing coil 20 for moving the objective lens 18 in a direction that cancels the focusing error. In this manner, the light beam 15 is made to converge accurately onto the reflection surface 14 of the optical disk 13.

In the course of advance of the light beam 15 emitted by the semiconductor laser 16 from the collimator lens 17 toward the objective lens 18, a part of the light beam 15 is taken by the FGC 31 and the FGC 32 into the optical waveguide 22. Therefore, in order to prevent the light beam 15 from being reflected by an edge face 22c of the optical waveguide 22 and detected by the first-set of photodetectors 24 and the second-set of photodetectors 25, a light absorbing member 45 should preferably be secured to the edge face 22c, or the edge face 22c should preferably be processed into a rough surface.

In the aforesaid embodiment, the FGC 31 and the FGC 32 are formed so that their gratings closely contact each other. However, the FGC 31 and the FGC 32 may be formed independently of each other in slightly spaced relation. This also applies to the embodiments described below.

Also, the FGC 31 and the FGC 32 may be formed so that the optical waves 15', 15' converged by the FGC 31 and the FGC 32 intersect each other, i.e. so that the position of optical wave convergence by the FGC 31 is on the lower side of the y axis in FIG. 2 and the position of optical wave convergence by the FGC 32 is on the upper side of the y axis.

Further embodiments of the optical pickup apparatus in accordance with the present invention will hereinbelow be described with reference to FIGS. 4 to 13. In FIGS. 4 to 13, similar elements are numbered with the same reference numerals with respect to FIG. 1.

Figure 4:
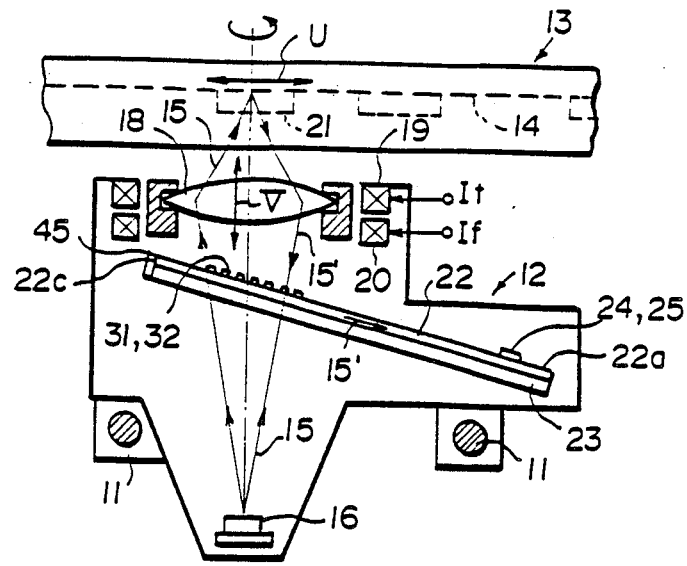

In an embodiment shown in FIG. 4, the collimator lens 17 in the embodiment shown in FIG. 1 is omitted, and the FGC 31 and the FGC 32 are constituted so that the light beam 15' reflected by the optical disk 13 is taken in the converged form into the optical waveguide 22. Also with this configuration, a tracking error and a focusing error can be detected by detecting the optical waves 15', 15' converged inside of the optical waveguide 22 by the first-set of photodetector 24 and the second-set of photodetectors 25 of the type as shown in FIG. 2.

Figure 5:
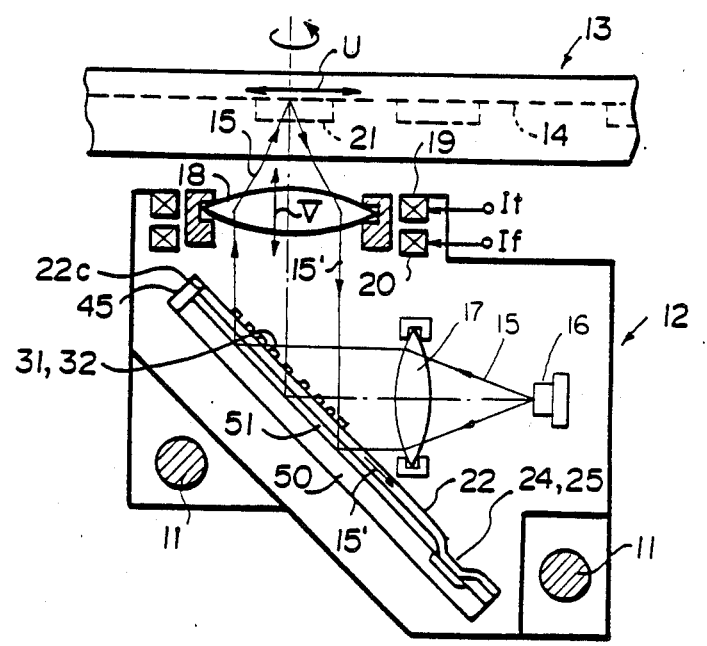

In an embodiment shown in FIG. 5, a support 50 is formed of a material exhibiting a substantially large refractive index, and the light beam 15 is reflected by the boundary between the support 50 and a buffer layer 51 toward the optical disk 13. Also in this case, the light beam 15'reflected by the optical disk 13 is coupled by the FGC 31 and the FGC 32 into the optical waveguide 22.

Figure 6:
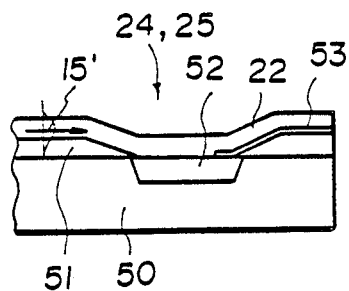
FIG. 6 is a side view showing the photodetector in the embodiment shown in FIG. 5, FIGS. 7, 8, 9 and 10 are side views showing still further embodiments of the optical pickup apparatus in accordance with the present invention.

With the configuration as shown in FIG. 5, the support 50 need not be formed of a transparent member. Therefore, in this case, it becomes possible to form the support 50 by use of, for example, an n type Si support, to dispose the buffer layer 51 for preventing the spreading-out optical wave (evanescent optical wave) of the optical waves 15', 15' which are being guided through the optical waveguide 22 from entering the support 50, and to integrate the photodiodes PD1 to PD4 by the provision of a p type Si layer 52 and an electrode 53 as shown in FIG. 6. The photodiodes PD1 to PD4 integrated in this manner are advantageous from the viewpoint of achieving quick response.

Figure 7:
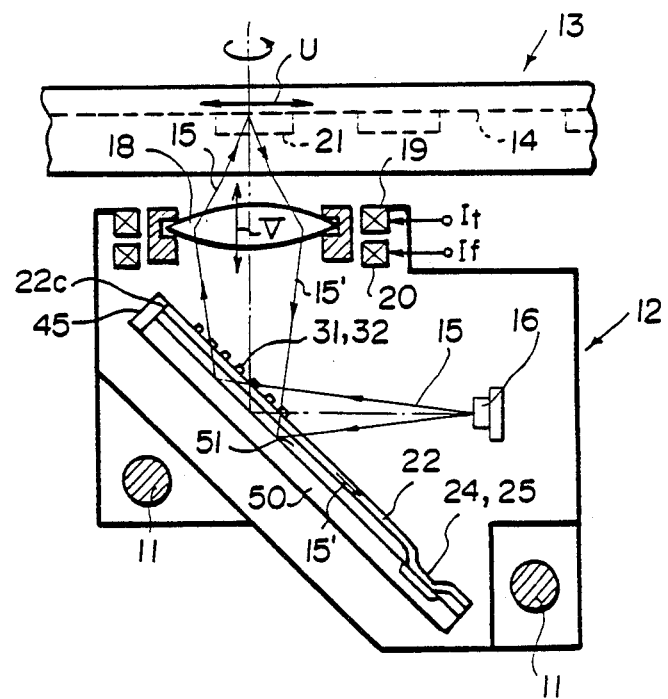

In an embodiment shown in FIG. 7, the light beam 15 emitted by the semiconductor laser 16 in the divergent form is reflected in this form by the boundary between the support 50 and the buffer layer 51 toward the optical disk 13.

Figure 8:
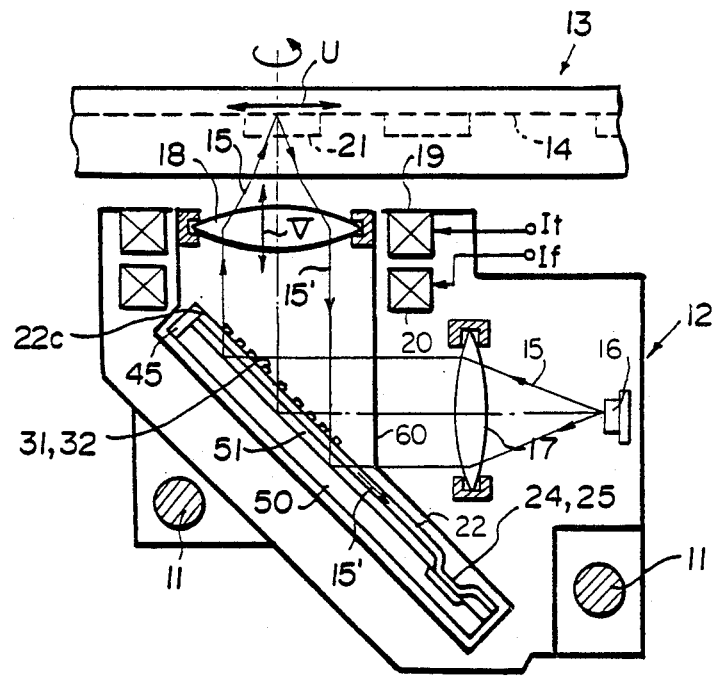

In an embodiment shown in FIG. 8, the optical waveguide 22 and the objective lens 18 are secured to a single head 60, and the head 60 is moveably supported in the tracking direction and in the focusing direction with respect to the block 12. The head 60 is moved by the tracking coil 19 and the focusing coil 20. Specifically, in this embodiment, the optical waveguide 22 is moved together with the objective lens 18 for the purposes of tracking control and focusing control. With this configuration, the problem that the objective lens 18 is deviated from the optical waveguide 22 in the course of tracking control as in the case where the objective lens 18 alone is moved can be eliminated, and tracking control can be carried out more accurately.

In the embodiment shown in FIG. 8, the light beam 15 reflected by the boundary between the support 50 and the buffer layer 51 is made to impinge upon the optical disk 13. However, also in the case where the optical waveguide 22 and the objective lens 18 are moved integrally with each other as mentioned above, it is possible to constitute the apparatus so that the light beam 15 passing through the optical waveguide 22 impinges upon the optical disk 13, or to constitute the apparatus so that the light beam 15 passes through the optical waveguide 22 in the divergent form or is reflected in the divergent form by the boundary between the support 50 and the buffer layer 51. Also, besides the optical waveguide 22 and the objective lens 18, the semiconductor laser 16 and the collimator lens 17 may be secured to the head 60 and may be moved integrally with the optical waveguide 22 and the objective lens 18.

Figure 9:
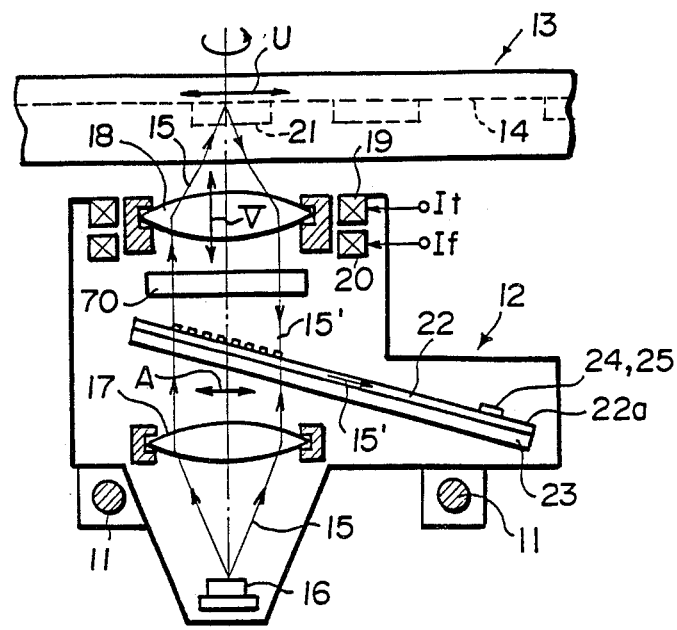

An embodiment shown in FIG. 9 is similar to the embodiment shown in FIG. 1, except that a quarter-wave plate 70 is disposed between the objective lens 18 and the optical waveguide 22, and grating pitches of the FGC 31 and the FGC 32 are adjusted to couple with the guided optical wave in a TE mode. Also, the semiconductor laser 16 is disposed so that the direction of linear polarization of the light beam 15 coincides with the direction as indicated by the arrow A.

With the embodiment constituted as shown in FIG. 9, the light beam 15 advancing from the collimator lens 17 toward the optical disk 13 is not taken by the FGC 31 and the FGC 32 into the optical waveguide 22. Therefore, in this case, it is not necessary to provide the light absorbing member 45 as in the embodiment shown in FIG. 1. Also, the light beam 15 linearly polarized in the direction as indicated by the arrow A is converted to circularly polarized light by the quarter-wave plate 70. When the light beam 15 is reflected as the reflected light beam 15' by the reflection surface 14, the direction of circular polarization is reversed. Then, as the reflected light beam 15' passes through the quarter-wave plate 70, it is linearly polarized normal to the direction as indicated by the arrow A. The reflected light beam 15' linearly polarized in this manner is taken by the FGC 31 and the FGC 32 coupling with the guided optical wave in the TE mode into the optical waveguide 22 with a high efficiency of, for example, approximately 80%. Therefore, with this embodiment, the amount of light returning to the semiconductor laser 16 decreases, the semiconductor laser 16 can operate consistently without being adversely affected by the return light since the direction of polarization of the return light becomes normal to the direction of polarization of the light beam 15 generated by the semiconductor laser 16, and the light receiving efficiencies of the photodiodes PD1 to PD4 become high. Accordingly, the S/N ratio of the read-out signals is improved by virtue of the three reasons mentioned above.

In the embodiment shown in FIG. 9, the objective lens 18 alone is moved for the purposes of tracking control and focusing control. However, as in the embodiment shown in FIG. 8, the optical waveguide 22 and the objective lens 18 may be secured to a common bed, and may be moved integrally with each other for carrying out tracking control and focusing control.

Figure 10:
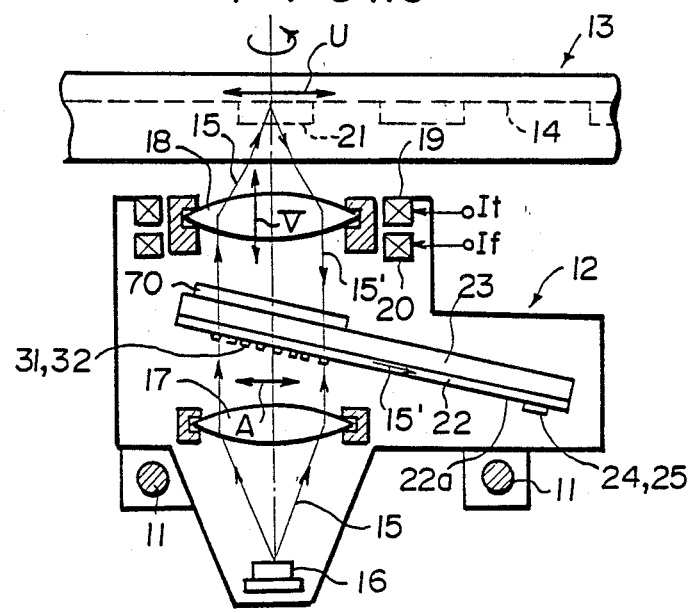

In an embodiment shown in FIG. 10, the optical waveguide 22 is disposed so that the FGC 31 and the FGC 32 stand facing the semiconductor laser 16, and the quarter-wave plate 70 is disposed on the rear side of the support 23. The quarter-wave plate 70 may be formed by film formation of an uniaxial crystal exhibiting double refraction such as LiNbO$_3$, TiO$_2$ or liquid crystal, or by merely adhering to the support 23 a quarter-wave plate subjected to appropriate compensation in accordance with the incidence angle of the reflected light beam 15'.

Also with the configuration as shown in FIG. 10, the same effects as in the embodiment shown in FIG. 9 can be obtained with the action of the quarter-wave plate 70. Further, in the embodiment wherein the quarter-wave plate 70 is formed integrally with the support 23, i.e. with the optical waveguide 22, it is not necessary to carry out adjustment of positions of the quarter-wave plate 70 and the optical waveguide 22 in the course of assembly of the optical pickup apparatus.

In the present invention, as shown in FIG. 10, the FGC 31 and the FGC 32 may be disposed on the surface of the optical waveguide opposite to the surface receiving the light beam reflected by the optical recording medium.

Figure 11:
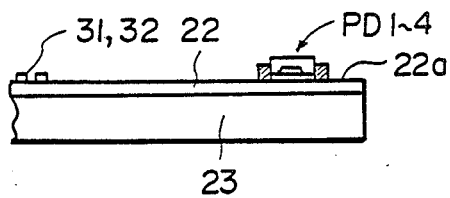
FIGS. 11, 12 and 13 are side views showing further examples of the photodetector used in the optical pickup apparatus in accordance with the present invention.
Figure 12:
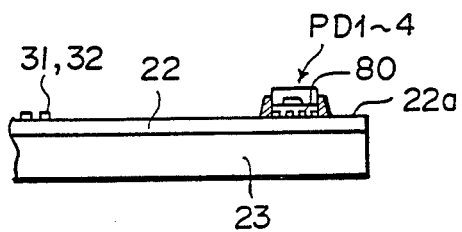
Figure 13:
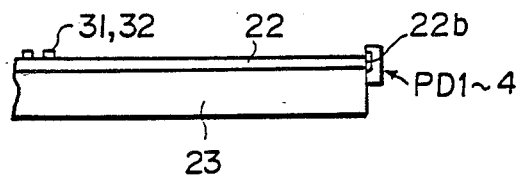

In the aforesaid seven embodiments, the first-set of photodetectors 24 and the second-set of photodetectors 25 are secured to or integrated with the surface 22a of the optical waveguide 22. However, the first-set photodetector 24 and the second-set photodetector 25 may be disposed in any other manner on the optical waveguide 22. For example, as shown in FIG. 11, the first-set of photodetectors 24 and the second-set of photodetectors 25 may be disposed close to the surface 22a of the waveguide 22. Also, in the case where the first-set of photodetectors 24 and the second-set of photodetectors 25 are disposed close to the surface 22a of the optical waveguide 22 in this manner, a diffraction grating 80 for radiating the guided optical waves (reflected light beam) 15', 15' out of the optical waveguide 22 may be disposed on the surface 22a of the optical waveguide 22 as shown in FIG. 12, thereby to improve the light receiving efficiencies of the first-set of photodetectors 24 and the second-set of photodetectors 25. Further, as shown in FIG. 13, the first-set of photodetectors 24 and the second-set of photodetectors 25 may be closely contacted with an edge face 22b of the optical waveguide 22 after the edge face 22b is polished.

Besides the aforesaid method of making the FGC 31 and the FGC 32, they can be formed by the planar technique by use of a known photolithographic method, a known holographic transfer method or the like, and can be easily mass-produced through duplication.

Still further embodiments of the optical pickup apparatus in accordance with the present invention, wherein a grating lens is used, will hereinbelow be described with reference to FIGS. 14 to 20. In FIGS. 14 to 20, similar elements are numbered with the same reference numerals with respect to FIGS. 1 and 2, except that the reference numeral 22 denotes a grating lens and reference numerals 31 and 32 denote a first focusing grating and a second focusing grating.

Figure 14:
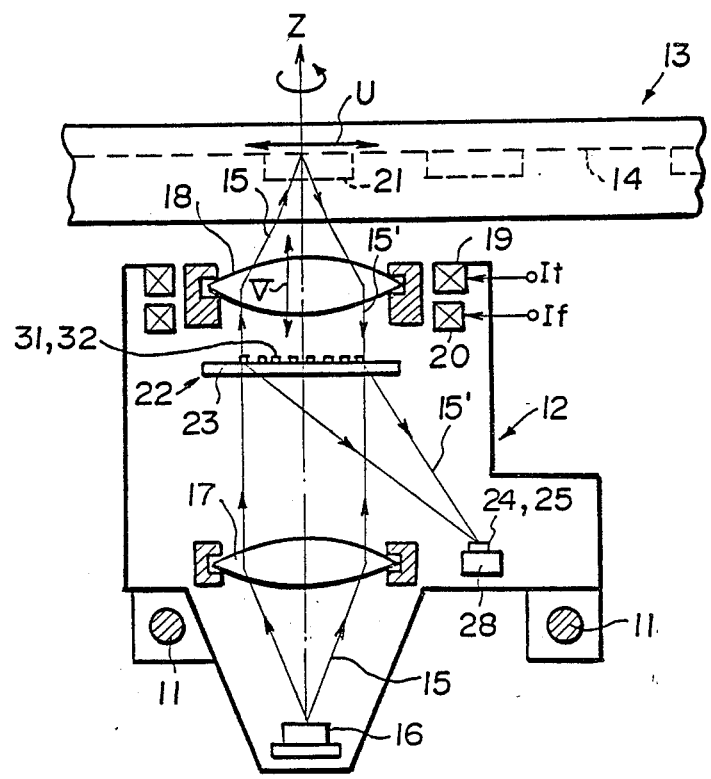
FIG. 14 is a side view showing another embodiment of the optical pickup apparatus in accordance with the present invention.
Figure 15:
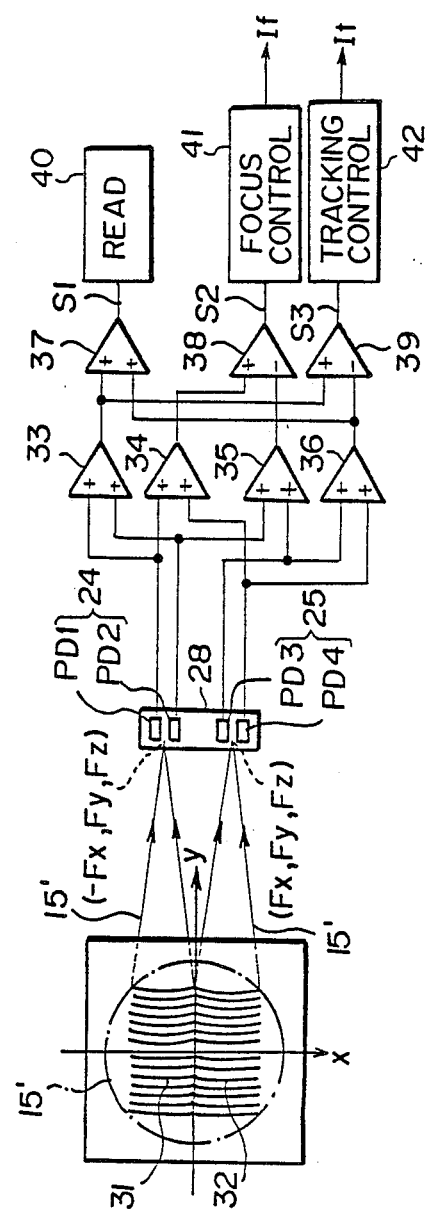
FIG. 15 is a schematic view showing the top plan shape of the grating lens in the embodiment shown in FIG. 14 and the electric circuit used for the embodiment.

FIG. 14 shows an embodiment of the optical pickup apparatus in accordance with the present invention, and FIG. 15 shows the top plan view of a grating lens in the embodiment shown in FIG. 14 and an electric circuit used for the embodiment. In the embodiment shown in FIG. 14, the grating lens 22 is disposed between the collimator lens 17 and the objective lens 18 in such a direction that a surface of the grating lens 22 receives the light beam 15' reflected by the optical disk 13. The grating lens 22 is composed of a transparent member 23, and the first focusing grating 31 and the second focusing grating 32 disposed adjacent to each other on the transparent member 23. (The focusing grating will hereinafter be abbreviated as FG.) Each of the FG 31 and the FG 32 is a diffraction grating having a curvature or a curvature and "chirp", and formed to diffract the reflected light beam 15' and converge it into a single spot outside of the grating lens 22. As shown in FIG. 15, the FG 31 and the FG 32 are disposed side by side so that a y axis on the surface of the grating lens 22 normal to the aforesaid tracking direction and passing through nearly the center of the reflected light beam 15' intervenes between the FG 31 and the FG 32. Also, the FG 31 and the FG 32 are formed to converge the reflected and diffracted light beams 15', 15' to positions spaced from each other with a plane, which passes through the y axis and is normal to the surface of the grating lens 22, intervening therebetween. When the space coordinates are defined by the y axis, the x axis, i.e. the axis in the tracking direction, in FIG. 15 and a z axis as shown in FIG. 14 and coordinates of the beam converging positions by the FG 31 and the FG 32 are respectively expressed as ($-Fx$, $Fy$, $Fz$) and ($Fx$, $Fy$, $Fz$), an m'th grating pattern of each of the FG 31 and the FG 32 having the aforesaid effects is expressed as $$\sqrt{(x \mp Fx)^2 + (y - Fy)^2 + Fz^2} = m\lambda + \text{const.}$$

$$\left( x \gtreqless 0, \text{ double signs in same order} \right)$$

where $\lambda$ denotes the optical wavelength of the reflected light beam 15'.

The FG 31 and the FG 32 may be formed by, for example, forming a Si-N film on the transparent member 23 by PCVD (plasma-enhanced chemical vapor deposition), forming a resist pattern by the electron beam direct drawing method, and then transferring the pattern to the Si-N film by RIE.

On the other hand, the first-set of photodetectors 24 and the second-set of photodetectors 25 are secured to the block 12 for respectively detecting the reflected light beams 15', 15' diffracted and converged in the manner as mentioned above. By way of example, the first-set of photodetectors 24 is composed of photodiodes PD1 and PD2 divided from each other by a gap, and the second-set of photodetectors 25 is composed of photodiodes PD3 and PD4 divided from each other by a gap. The photodiodes PD1 to PD4 are secured to a supporting member 28.

As shown in FIG. 15, the electric circuit for the embodiment shown in FIG. 14 is constituted in the same manner as mentioned with reference to FIG. 2.

Operations of the embodiment shown in FIG. 14 will be described hereinbelow. The light beam (laser beam) 15 emitted by the semiconductor laser 16 and collimated by the collimator lens 17 passes through the grating lens 22 and is converged by the objective lens 18 so that the light beam 15 is focused on the reflection surface 14 of the optical disk 13. The optical disk 13 is rotated by a rotation drive means (not shown) so that the string (track) of the pits 21 is moved in the direction as indicated by the arrow U at the incidence position of the light beam 15. The reflected light beam 15' passes through the objective lens 18, and is diffracted in the manner as mentioned above by the FG 31 and the FG 32 of the grating lens 22. The reflected light beams 15', 15' thus diffracted and separated from the optical path of the light beam 15 are converged by the beam converging effects of the FG 31 and the FG 32 into two spots spaced from each other with a plane, which passes through the y axis and is normal to the surface of the grating lens 22, intervening therebetween. The light amount of the reflected light beam 15' converged by the FG 31 is detected by the photodiodes PD1 and PD2, and the light amount of the reflected light beam 15' converged by the FG 32 is detected by the photodiodes PD3 and PD4. Therefore, the output S1 of the addition amplifier 37 which adds the outputs of the addition amplifiers 33 and 36 together represents the overall light amount of the light beam 15'reflected by the optical disk 13, i.e. irrespective of presence or absence of the pits 21 on the optical disk 13. The output S1 is subjected to read-out processing in the read-out circuit 40, and the information recorded on the optical disk 13 is read out in this manner.

Also in the embodiment shown in FIG. 14, tracking control and focusing control are effected in the same manner as mentioned with reference to FIGS. 1 and 2.

In the embodiment shown in FIG. 14, the FG 31 and the FG 32 are formed so that their gratings closely contact each other. However, the FG 31 and the FG 32 may be formed independently of each other in a slightly spaced relationship. This also applies to the embodiments described below.

Also, the FG 31 and the FG 32 may be formed so that the reflected light beams 15', 15' converged by the FG 31 and the FG 32 intersect each other, i.e. so that the position of beam convergence by the FG 31 is on the lower side of the y axis in FIG. 15 and the position of beam convergence by the FG 32 is on the upper side of the y axis.

Figure 16:
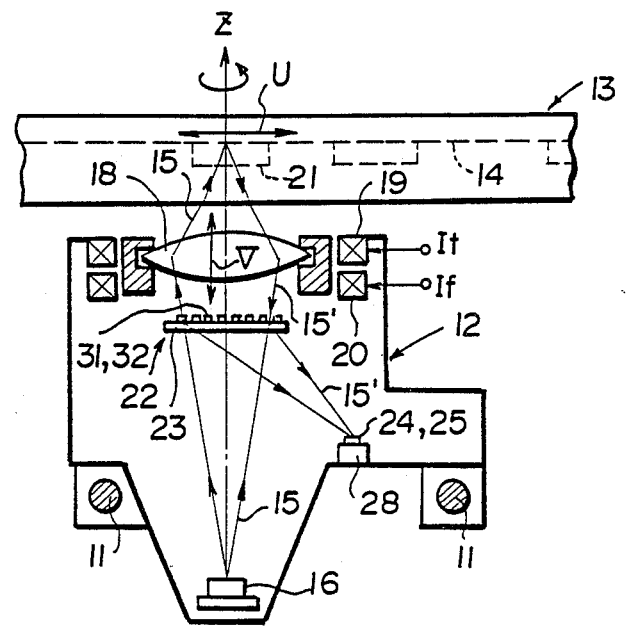
FIGS. 16, 17, 18 and 19 are side views showing further embodiments of the optical pickup apparatus in accordance with the present invention.

In another embodiment shown in FIG. 16, the collimator lens 17 in the embodiment shown in FIG. 14 is omitted, and the light beam 15' reflected by the optical disk 13 passes in the converged form through the grating lens 22. Also with this configuration, tracking error and focusing error can be detected by detecting the reflected light beams 15', 15', which are converged by the action of the grating lens 22, by the first-set of photodetectors 24 and the second-set photodetector 25 of the type as shown in FIG. 15.

In this case, when the space coordinates and the coordinates of the beam converging positions by the FG 31 and the FG 32 are defined in the same manner as in the embodiment shown in FIG. 14 and the coordinates of the light source are defined as (0, 0, Lz), an m'th grating pattern of each of the FG 31 and the FG 32 is expressed as $$\sqrt{x^2 + y^2 + Lz^2} + \sqrt{(x \mp Fx)^2 + (y - Fy)^2 + Fz^2} = m\lambda + \text{const.}$$

$$\left( x \gtreqless 0, \text{ double signs in same order} \right)$$

Figure 17:
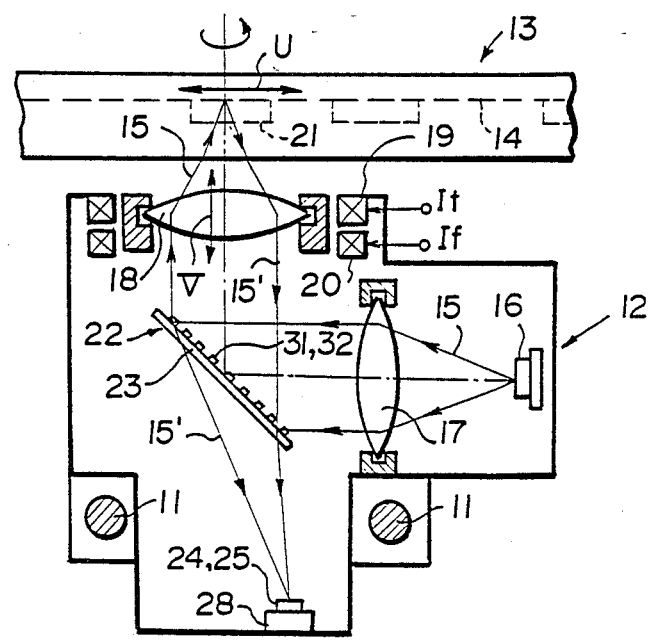

In a further embodiment shown in FIG. 17, the transparent member 23 is formed of a material exhibiting a substantially large refractive index, and the light beam 15 is reflected by the surface of the transparent member 23 toward the optical disk 13. Also in this case, the light beam 15' reflected by the optical disk 13 is diffracted and converged by the FG 31 and the FG 32.

Figure 18:
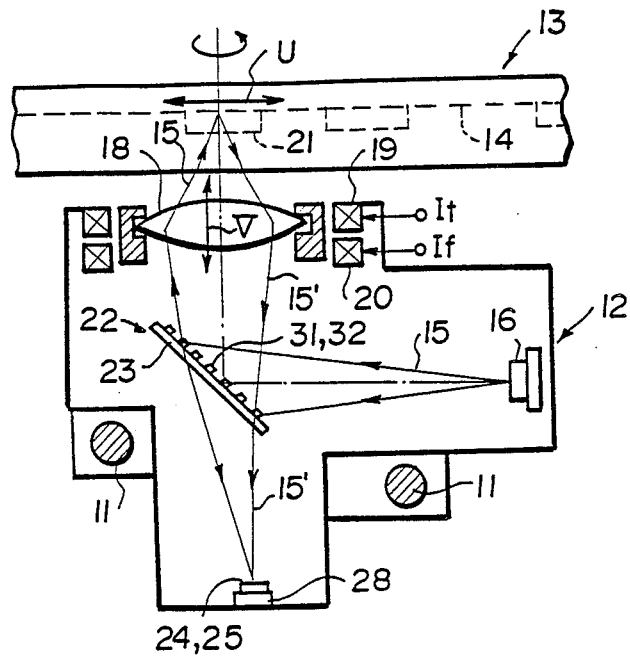

In a still further embodiment shown in FIG. 18, the light beam 15 emitted by the semiconductor laser 16 in the divergent form is reflected in this form by the surface of the transparent member 23 toward the optical disk 13.

Figure 19:
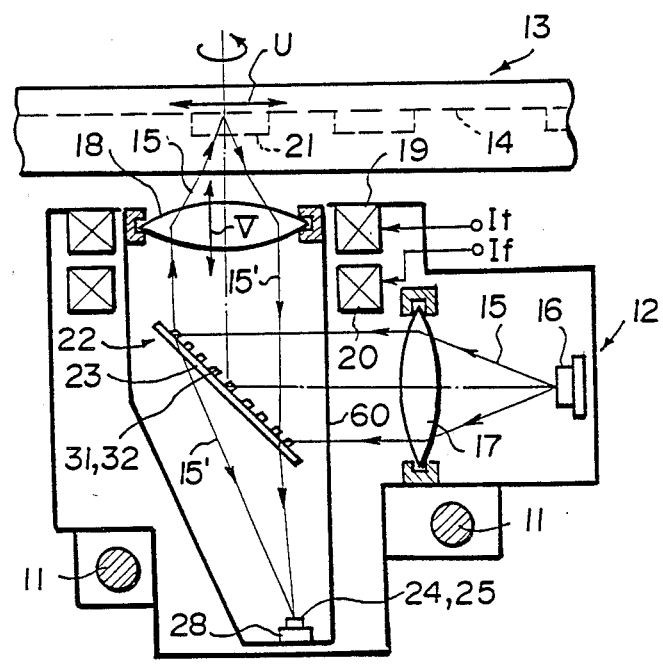

In another embodiment shown in FIG. 19, the grating lens 22 and the objective lens 18 are secured to a single head 60, and the head 60 is moveably supported in the tracking direction and in the focusing direction with respect to the block 12. The head 60 is moved by the tracking coil 19 and the focusing coil 20. Specifically, in this embodiment, the grating lens 22 is moved together with the objective lens 18 for the purposes of tracking control and focusing control. With this configuration, the problem that the objective lens 18 is deviated from the grating lens 22 in the course of tracking control as in the case where the objective lens 18 alone is moved can be eliminated, and tracking control can be carried out more accurately.

In the embodiment shown in FIG. 19, the light beam 15 reflected by the surface of the grating lens 22 is made to impinge upon the optical disk 13. However, also in the case where the grating lens 22 and the objective lens 18 are moved integrally with each other as mentioned above, it is possible to constitute the apparatus so that the light beam 15 passing through the grating lens 22 impinges upon the optical disk 13, or to constitute the apparatus so that the light beam 15 passes through the grating lens 22 in the divergent form or is reflected in the divergent form by the grating lens 22. Also, besides the grating lens 22 and the objective lens 18, the semiconductor laser 16 and the collimator lens 17 may be secured to the head 60 and may be moved integrally with the grating lens 22 and the objective lens 18.

In the embodiments shown in FIGS. 14 to 19, the reflected light beam 15' is split into two light beams 15', 15', tracking error is detected by the push-pull technique, and focusing error is detected by the Foucault technique. However, detection of the tracking error and the focusing error may be carried by use of any other technique. For example, in another embodiment shown in FIG. 20, a grating lens 70 provided with a single FG 71 is used, and the grating lens 70 is constituted as an astigmatism lens by the adjustment of the FG 71. Therefore, the reflected light beam 15' passing through the grating lens 70 has astigmatism, and the tracking error and the focusing error can be detected respectively by use of the known heterodyning technique and the astigmatism technique by detecting the reflected light beam 15' by a photodetector 72 composed of four photodiodes divided from each other.

Figure 20:
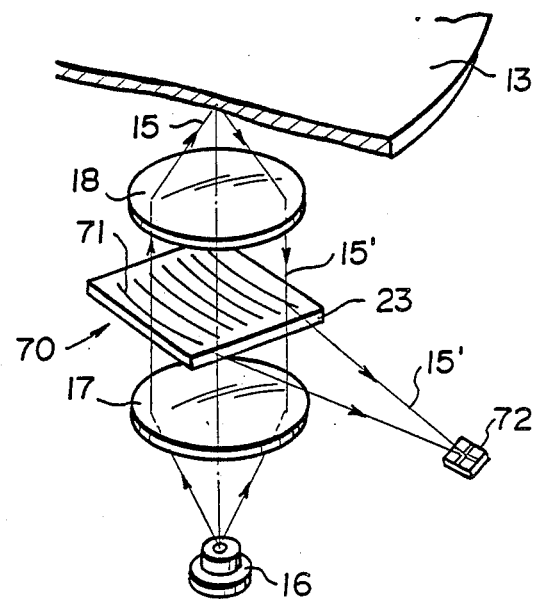
FIG. 20 is a schematic perspective view showing a still further embodiment of the optical pickup apparatus in accordance with the present invention.

Also in the case where the tracking error and the focusing error are detected in the manner as mentioned with respect to FIG. 20, the apparatus may be constituted so that the light beam 15 passes in the divergent form through the grating lens 70, or so that the light beam 15 is reflected by the surface of the grating lens 70 toward the optical disk 13. Further, tracking control and focusing control may be carried out by moving the objective lens 18 alone or together with the grating lens 70.

Besides the aforesaid method of making the grating lens 22 or the grating lens 70, they can be formed by the planar technique by use of a known photolithographic method, a known holographic transfer method or the like, and can be easily mass-produced through duplication.

We claim:

1. An optical pickup apparatus for an optical recording medium having a reflection surface, the optical pickup apparatus comprising:
   a light source for emitting a light beam;
   an objective lens for converging the emitted light beam onto the reflection surface of the recording medium, said objective lens being movably supported in a tracking and a focusing direction of the recording medium;
   an optical waveguide disposed in such a direction that one surface thereof receives the light beam reflected by the reflection surface of the optical recording medium;
   first and second focusing grating couplers each disposed next to each other and adjacent the one surface of said optical waveguide which receives the reflected light beam, said first focusing grating coupler causing the reflected light beam to enter said optical waveguide thereby forming a first optical wave and converging the first optical wave through said waveguide to a first predetermined point, said second focusing grating coupler casing the reflected light beam to enter said optical waveguide thereby forming a second optical wave and converging the second optical wave through said waveguide to a second predetermined point;
   first and second set of photodetectors secured to one of a surface and an edge face of said optical waveguide for respectively detecting an amount of light at the first predetermined point and for detecting an amount of light at the second predetermined point;
   a tracking control circuit, coupled to said first and second set of photodetectors, for receiving a tracking error signal and for generating a tracking correction signal in accordance with the tracking error signal;
   a focusing control circuit, coupled to said first and second set of photodetectors, for receiving a focusing error signal and for generating a focusing correction signal in accordance with the focusing error signal.

2. An apparatus as defined in claim 1 wherein said first-set of photodetectors comprises a first photodetector and a second photodetector spaced from said first photodetector, and said second-set of photodetectors comprises a third photodetector and a fourth photodetector spaced from said third photodetector, the first predetermined point being located between the first and second photodetectors, and the second predetermined point being located between the third and fourth photodetectors, the tracking error signal being derived from the difference between the sum of the first and second photodetectors and the sum of the third and fourth photodetectors in accordance with a push-pull technique, and the focusing error being derived from the difference between the sum of the first and fourth photodetectors and the sum of the second and third photodetectors in accordance with a Foucault technique.

3. An apparatus as defined in claim 2 further comprising a support for said optical waveguide, said support being formed of a transparent member, and wherein said optical waveguide is disposed between said light source, and said objective lens.

4. An apparatus as defined in claim 3, further comprising means for moving said movably supported objective lens, with respect to said light source, in the tracking direction in accordance with the tracking correction signal and in the focusing direction in accordance with the focusing correction signal, wherein said optical waveguide and said objective lens are disposed independently of each other, and wherein said moving means only moves said objective lens with respect to said light source for the purposes of tracking control and focusing control.

5. An apparatus as defined in claim 3, further comprising means for moving said movably supported objective lens, with respect to said light source, in the tracking direction in accordance with the tracking correction signal and in the focusing direction in accordance with the focusing correction signal, wherein said optical waveguide is disposed integrally with said objective lens, and wherein said moving means moves said optical waveguide together with said objective lens, with respect to said light source, for the purposes of tracking control and focusing control.

6. An apparatus as defined in claim 2 further comprising a support for said waveguide, and a buffer layer, disposed between said optical waveguide and said support, for preventing optical waves from entering said support, and wherein said optical waveguide is disposed so that said light beam emitted by said light source is reflected by a boundary between said buffer layer and said support toward said optical recording medium.

7. An apparatus as defined in claim 6, further comprising means for moving said movably supported objective lens, with respect to said light source, in the tracking direction in accordance with the tracking correction signal and in the focusing direction in accordance with a focusing correction signal, wherein said optical waveguide and said objective lens are disposed independently of each other, and wherein said moving means only moves said objective lens with respect to said light source for the purposes of tracking control and focusing control.

8. An apparatus as defined in claim 6, further comprising means for moving said movably supported objective lens, with respect to said light source, in the tracking direction in accordance with the tracking correction signal and in the focusing direction in accordance with the focusing correction signal, wherein said optical waveguide is disposed integrally with said objective lens, and wherein said moving means moves said optical waveguide together with said objective lens, with respect to said light source, for the purposes of tracking control and focusing control.

9. An apparatus as defined in claim 2, further comprising means for moving said movably supported objective lens, with respect to said light source, in the tracking direction in accordance with the tracking correction signal and in the focusing direction in accordance with the focusing correction signal, wherein said optical waveguide and said objective lens are disposed independently of each other, and wherein said moving means only moves said objective lens with respect to said light source for the purposes of tracking control and focusing control.

10. An apparatus as defined in claim 2, further comprising means for moving said movably supported objective lens, with respect to said light source, in the tracking direction in accordance with the tracking correction signal and in the focusing direction in accordance with the focusing correction signal, wherein said optical waveguide is disposed integrally with said objective lens and wherein said moving means moves said optical waveguide together with said objective lens, with respect to said light source, for the purposes of tracking control and focusing control.

11. An apparatus as defined in claim 1 further comprising a support for said optical waveguide, said support being formed of a transparent member, and wherein said optical waveguide is disposed between said light source and said objective lens.

12. An apparatus as defined in claim 11, further comprising means for moving said movably supported objective lens, with respect to said light source, in the tracking direction in accordance with the tracking correction signal and in the focusing direction in accordance with the focusing correction signal, wherein said optical waveguide and said objective lens are disposed independently of each other, and wherein said moving means only moves said objective lens with respect to said light source for purposes of tracking control and focusing control.

13. An apparatus as defined in claim 11, further comprising means for moving said movably supported objective lens, with respect to said light source, in the tracking direction in accordance with a tracking correction signal and in the focusing direction in accordance with a focusing correction signal, wherein said optical waveguide is disposed integrally with said objective lens, and wherein said moving means moves said optical waveguide together with said objective lens, with respect to said light source, for the purposes of tracking control and focusing control.

14. An apparatus as defined in claim 1 further comprising a support for said waveguide, and a buffer layer, disposed between said optical waveguide and said support, for preventing optical waves from entering said support and wherein said optical waveguide is disposed so that said light beam emitted by said light source is reflected by a boundary between said buffer layer and said support toward said optical recording medium.

15. An apparatus as defined in claim 14, further comprising means for moving said movably supported objective lens, with respect to said light source, in the tracking direction in accordance with the tracking correction signal and in the focusing direction in accordance with the focusing correction signal, wherein said optical waveguide and said objective lens are disposed independently of each other, and wherein said moving means only moves said objective lens with respect to said light source for the purposes of tracking control and focusing control.

16. An apparatus as defined in claim 14, further comprising means for moving said movably supported objective lens, with respect to said light source, in the tracking direction in accordance with a tracking correction signal and in the focusing direction in accordance with a focusing correction signal, wherein said optical waveguide is disposed integrally with said objective lens, and wherein said moving means moves said optical waveguide together with said objective lens, with respect to said light source, for the purposes of tracking control and focusing control.

17. An apparatus as defined in claim 1 further comprising means for moving said movably supported objective lens, with respect to said light source, in the tracking direction in accordance with the tracking correction signal and in the focusing direction in accordance with a focusing correction signal, and wherein said optical waveguide and said objective lens are disposed independently of each other, and wherein said moving means only moves said objective lens with respect to said light source for the purposes of tracking control and focusing control.

18. An apparatus as defined in claim 1, further comprising means for moving said movably supported objective lens, with respect to said light source, in the tracking direction in accordance with the tracking correction signal and in the focusing direction in accordance with the focusing correction signal, wherein said optical waveguide is disposed integrally with said objective lens, and wherein said moving means moves said objective lens together with said optical waveguide, with respect to said light source, for the purposes of tracking control and focusing control.

19. An optical pickup apparatus as defined in claim 1, further comprising a reading circuit for receiving a read signal representing the outputs of all the photodetectors of said first and second set of photodetectors, and for performing read-out processing on the read signal thereby obtaining information recorded on the recording medium.

20. An optical pickup apparatus for an optical recording medium having a reflection surface, the optical pickup apparatus comprising:
　a light source for emitting a light beam;
　an objective lens for converging the emitted light beam onto the reflection surface of the optical recording medium;
　a first grating lens disposed in such a direction that one surface thereof receives the light beam reflected by the reflection surface of the recording medium, said first grating lens causing the received reflected light beam to be split into first and second reflected light beams, and causing the first and second reflected light beams to converge at a first predetermined point;
　photodetector means for detecting an amount of light at the first predetermined point;

a tracking control circuit, coupled to said photodetector means, for receiving a tracking error signal and for outputting a tracking correction signal in accordance with the received tracking error signal; and a focusing control circuit, coupled to said photodetector means, for receiving a focusing error signal and for outputting a focusing correction signal in accordance with the focusing error signal.

21. An apparatus as defined in claim 20 wherein said first grating lens constitutes an astigmatism lens, and said photodetector comprises four photodetectors divided from each other and disposed so that detection of a tracking error can be effected by a heterodyning technique and detection of a focusing error can be effected by an astigmatism technique.

22. An apparatus as defined in claim 21 wherein said first grating lens is disposed between said light source and said objective lens.

23. An apparatus as defined in claim 21 wherein said first grating lens is disposed to reflect said light beam emitted by said light source toward said optical recording medium.

24. An apparatus as defined in claim 20, wherein said first grating lens is disposed between said light source and said objective lens.

25. An apparatus as defined in claim 20 wherein said first grating lens is disposed to reflect said light beam emitted by said light source toward said optical recording medium.

26. The optical pickup apparatus as defined in claim 20, wherein said objective lens is movably supported in a tracking and a focusing direction of the recording medium, the optical pickup apparatus further comprises means for moving said movably supported objective lens, with respect to said light source, in the tracking direction in accordance with the tracking correction signal outputted by said tracking control circuit, and in the focussing direction in accordance with the focusing correction signal outputted by said focusing control circuit.

27. An apparatus as defined in claim 26 wherein said first and second grating lens is disposed between said light source and said objective lens.

28. An apparatus as defined in claim 26 wherein said first and second grating lens are disposed to reflect said light beam emitted by said light source toward said optical recording medium.

29. The optical pickup apparatus as defined in claim 26, further comprising a second grating lens disposed next to said first grating lens, said second grating lens causing the received reflected light beam to be split into third and fourth reflected light beams, and causing the third and fourth reflected light beams to converge at a second predetermined point spaced from the first predetermined point, and wherein said photodetector means comprises first and second photodetectors for detecting an amount light at the first predetermined point, and third and fourth photodetectors for detecting an amount of light at the second predetermined point, and wherein said tracking error signal is derived from a difference between the sum of the outputs of said first and second photodetectors and the sum of the outputs of said third and fourth photodetectors, thereby determining the tracking error signal in accordance with a push-pull technique, and wherein the focusing error signal is derived from the difference between the sum of said first and fourth photodetectors and the sum of said second and third photodetectors, thereby determining the focusing error signal in accordance with a Foucault technique.

30. An optical pickup apparatus as defined in claim 26, further comprising a reading circuit for receiving a read signal representing the outputs of all the photodetectors of said first and second set of photodetectors, and for performing read-out processing on the read signal thereby obtaining information recorded on the recording medium.

31. An apparatus as defined in any one of claims 1 to 18, wherein said light source is a laser for emitting a linearly polarized laser beam, the apparatus further comprises a quarter-wave plate disposed in an optical path of the reflected laser beam between said objective lens and said focusing grating couplers, and said focusing grating couplers are formed so that only the reflected laser beam polarized linearly by passage through said quarter-wave plate is coupled into said optical waveguide.

32. An apparatus as defined in any one of claims 20-28, further comprising means for moving said movably supported objective lens, with respect to said light source, in the tracking direction in accordance with the tracking correction signal and in the focusing direction in accordance with the focusing correction signal, wherein said grating lens and said objective lens are disposed independently of each other, and wherein said moving means only moves said objective lens with respect to said light source for the purposes of tracking control and focusing control.

33. An apparatus as defined in any one of claims 20-28, further comprising means for moving said movably supported objective lens, with respect to said light source, in the tracking direction in accordance with the tracking correction signal and in the focusing direction in accordance with the focusing correction signal, wherein said grating lens is disposed integrally with said objective lens, and wherein said moving means moves said grating lens together with said objective lens, with respect to said light source, for the purposes of tracking control and focusing control.

* * * * *